United States Patent
Sato

[11] Patent Number: 6,120,169
[45] Date of Patent: Sep. 19, 2000

[54] HEADLIGHT FOR VEHICLE USE

[75] Inventor: Masakazu Sato, Shizuoka, Japan

[73] Assignee: Koito Manufacturing Co., Ltd., Tokyo, Japan

[21] Appl. No.: 09/145,344

[22] Filed: Sep. 1, 1998

[30] Foreign Application Priority Data

Sep. 11, 1997  [JP]  Japan ................................ 9-264835

[51] Int. Cl.[7] ......................................................... F21V 7/16
[52] U.S. Cl. ............................ 362/517; 362/544; 362/346
[58] Field of Search ...................................... 362/517, 346, 362/297, 544, 237, 244

[56] References Cited

U.S. PATENT DOCUMENTS

| | | | |
|---|---|---|---|
| 4,903,173 | 2/1990 | Mochizuki et al. | 362/544 |
| 5,119,275 | 6/1992 | Makita . | |
| 5,140,504 | 8/1992 | Sato . | |
| 5,671,995 | 9/1997 | Serizawa et al. . | |
| 5,941,633 | 8/1999 | Saito et al. | 362/544 |

FOREIGN PATENT DOCUMENTS

| | | | |
|---|---|---|---|
| 0 579 184 | 1/1994 | European Pat. Off. | B60Q 1/04 |
| 42 29 728 | 1/1994 | Germany | F21M 3/16 |
| 2 308 649 | 7/1997 | United Kingdom | F21M 3/00 |

*Primary Examiner*—Thomas M. Sember
*Attorney, Agent, or Firm*—Sughrue, Mion, Zinn, Macpeak & Seas, PLLC

[57] ABSTRACT

It is an object of the present invention to provide a headlight for vehicle use in which an upper reflector unit and a lower reflector unit are arranged, capable of ensuring a sufficiently large quantity of light of a main beam so that the visibility can be enhanced in the case of driving at night. A low beam reflector unit and a main beam reflector, are integrated with each other, each having a light source bulb. Direct light emitted from the main beam light source bulb passes through a space in the front of the boundary section between both reflectors and is incident on the reflector surface of the low beam reflector unit. Therefore, when the main beam light source bulb is turned on, direct light emitted from the main beam light source bulb is reflected on the reflecting surface of the low beam reflector and irradiated to the front. At the same time, direct light emitted from the main beam light source bulb is also reflected on the main beam reflecting surface and irradiated to the front. Due to the foregoing, it is possible to increase a quantity of light of the main beam.

7 Claims, 6 Drawing Sheets

HEADLIGHT FOR VEHICLE USE

BACKGROUND OF THE INVENTION

The present invention relates to a headlight for vehicle use having an upper reflector unit and a lower reflector unit.

As known in the art, a headlight for vehicle use includes: a reflector unit composed of a reflector and a light source bulb attached to the reflector; and a lens arranged in the front of the reflector unit. In a conventional four-light type headlight, there are provided a low beam reflector unit and a main beam reflector unit. In many cases, the low beam reflector unit and main beam reflector unit are arranged in parallel in the transverse direction.

In order to enhance visibility in the case of driving a vehicle at night, it is desirable to have a sufficiently large quantity of light emitted from a low beam and also a main beam. Especially in the case of a vehicle frequently used for a long distance drive or a drive out of a city area, the main beam is frequently used. Accordingly, it is important to ensure a sufficiently large quantity of light of the main beam.

However, in the case of a conventional headlight in which both reflector units are arranged in parallel in the transverse direction, when the layout of the lighting device is designed, it is difficult to provide a large reflecting surface of the main beam reflector unit. Therefore, the main beam reflecting emitting area is less than sufficient. As a result, it is impossible to ensure a sufficiently large quantity of light of a main beam within the space generally available for a headlight.

On the other hand, a headlight for vehicle use is conventionally known in which reflector units are arranged in an upper and a lower row. However, in this conventional headlight for vehicle use, the low beam reflector unit and the main beam reflector unit are completely separate from each other. Therefore, it is impossible to ensure a sufficiently large reflecting emitting area of the main beam reflector unit. For the above reasons, it is impossible to ensure a sufficiently large quantity of light of a main beam within the space generally available for a headlight.

The present invention has been accomplished in view of the above circumstances. It is an object of the present invention to provide a headlight for vehicle use in which an upper reflector unit and a lower reflector unit are arranged to allow communication of light between them, thereby ensuring a sufficiently large quantity of light of a main beam, while minimizing the overall size of the headlight.

SUMMARY OF THE INVENTION

According to the present invention, the above object can be accomplished by a structure of a lighting device in which a reflector surface of the low beam reflector unit is also used for the main beam when light of the main beam is turned on.

The present invention provides a headlight for vehicle use an upper reflector unit adapted for forming a low beam;
  a lower reflector unit adapted for forming a main beam;
  a light source bulb attached to at each of the upper reflector unit and lower reflector unit;
  a boundary section between the upper reflector unit and the lower reflector unit;
  wherein the upper reflector unit and the lower reflector unit are integrated with each other; and
  wherein direct light emitted from the light source bulb of the lower reflector unit passes through a space in the front of the boundary section and is incident on the upper reflector unit.

The light source bulb of the upper reflector unit may be turned on simultaneously with the light source bulb of the lower reflector unit. Alternatively, the light source bulb of the upper reflector unit may not be turned on simultaneously with the light source bulb of the lower reflector unit.

The above headlight may be a movable unit type headlight in which the reflector is fixed to the lens. Alternatively, the above headlight may be a movable reflector type headlight in which the reflector is accommodated in a space formed by the lens and lamp body.

As described above, according to the present invention, a headlight for vehicle use is characterized in that an upper reflector unit is a low beam reflector unit and a lower reflector unit is a main beam reflector unit. These reflector units are integrated with each other, and direct light emitted from the light source bulb of the lower reflector unit passes through a space in the front of a boundary section between both reflectors and is incident on a reflector surface of the upper reflector unit. Therefore, when the main beam of light is turned on, direct light emitted from the light source bulb of the lower reflector unit is reflected on a reflecting surface of the lower reflector unit and irradiated to the front and at the same time reflected on a reflecting surface of the upper reflector unit and irradiated to the front. Due to the foregoing, it is possible to enhance a quantity of light of a main beam of the headlight.

Therefore, according to the present invention, it is possible to ensure a sufficiently large quantity of light of a main beam of the headlight for vehicle use in which an upper and a lower reflector unit are arranged. Due to the foregoing, it is possible to enhance visibility when a vehicle is driven at night.

In the case where a lower reflector unit composes a low beam reflector unit, unlike the present invention, a problem may be caused, in which light emitted from the lower reflector unit leaks onto the upper reflector unit when the low beam light is turned on, and glare light may be generated. However, according to the present invention, it is possible to avoid the occurrence of the above problem.

In the invention, direct light emitted from the light source bulb of the lower reflector unit passes through a space in the front of the boundary section and is incident on the reflector surface of the upper reflector unit. A front edge of the boundary section is located at the rear of a straight line connecting a light emitting center of the light source bulb of the upper reflector unit with a light emitting center of the light source bulb of the lower reflector unit.

A shape of the above boundary section is not limited to a specific shape. However, the front edge of the boundary section extends substantially in the horizontal direction in a front view of the lighting device.

A single lens can be arranged in front of the upper reflector unit and the lower reflector and a partition plate can be arranged in front of the boundary section. The partition plate can be close to an inner surface of the lens so that the partition plate extends substantially in a horizontal direction along the lens. Due to the above arrangement, when the lighting device is observed from the outside, a lighting chamber for low beam and a lighting chamber for main beam are partitioned from each other. Therefore, although direct light emitted from the light source bulb of the lower reflector unit is incident on the reflecting surface of the reflector of the upper reflector unit, a person observing the lighting device can have a good impression in the design of the lighting device.

The aforementioned predetermined longitudinal width is not limited to a specific value as long as direct light emitted from the light source bulb of the lower reflector unit, which is incident on the reflecting surface of the upper reflector unit, is not completely shaded.

The material, shape and supporting structure of the above partition plate are not particularly limited. Concerning the supporting structure of the above partition plate, it is possible to adopt a variety of structures. For example, in the movable unit type headlight, the above partition plate is held by both reflectors and the lens. In the movable reflector type headlight, the partition plate is held by the lamp body and the lens. Alternatively, in the case where an extension is provided along an outer circumferential edge section of both reflectors, the partition plate is integrated with the extension into one body, or the partition plate is engaged with the extension.

A thick section extending along the partition plate may be arranged on an inner surface of the lens in such a manner that the thick section extends along and contacts a lower surface of the partition plate. It is therefore possible to prevent the deflection of the partition plate. Further, when the lighting device is seen from the front, a front end portion of the partition plate would not be seen as a dark portion by the lens effect of the thick portion.

A type of the light source bulb of each reflector unit is not particularly limited in the above arrangement. However, when the light source bulb of the lower reflector unit is composed of an electric discharge bulb, a quantity of light of a main beam can be greatly increased and the color rendering can be enhanced by the effect of high power and high luminance of the electric discharge bulb. Therefore, it is possible to further enhance the visibility in the case of driving at night.

When the light source bulb of the upper reflector unit is composed of an electric discharge bulb as described in claim 7, the low beam is well balanced with respect to the main beam, thereby enhancing the performance of the entire lighting device.

BRIEF DESCRIPTION OF THE DRAWINGS

FIG. 6 is a view showing a variation of the first embodiment, wherein FIG. 6 shows a lighting device in the same view as that of FIG. 2.

FIG. 7 is a view showing a headlight of the second embodiment of the present invention, wherein FIG. 7 shows a lighting device of the invention in the same view as that of FIG. 2.

DETAILED DESCRIPTION OF THE PREFERRED EMBODIMENT

Referring to the accompanying drawings, embodiments of the present invention will be explained below.

The first embodiment of the present invention will be explained as follows.

Figure 1:
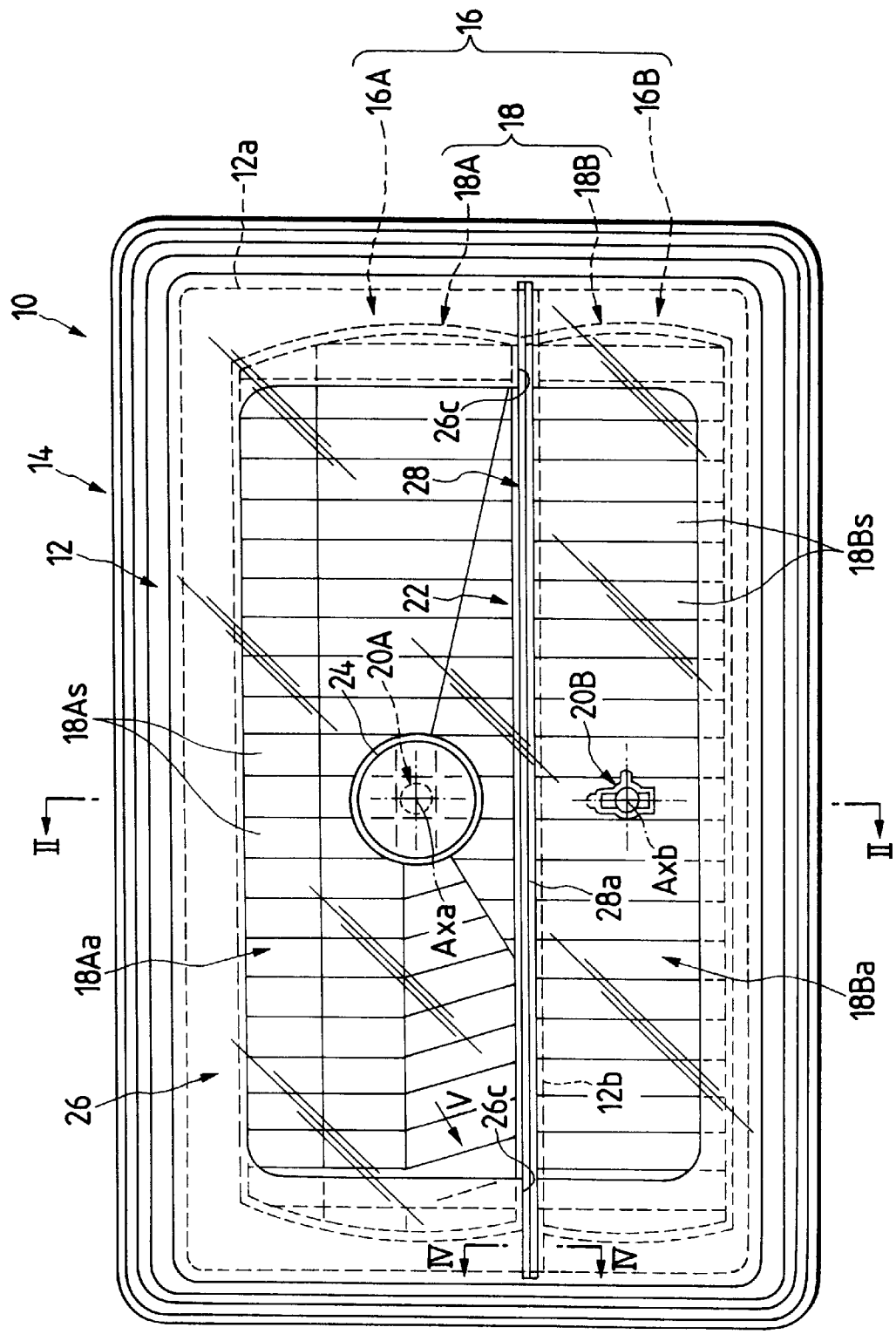
FIG. 1 is a front view showing a headlight for vehicle use of the first embodiment of the present invention.
Figure 2:
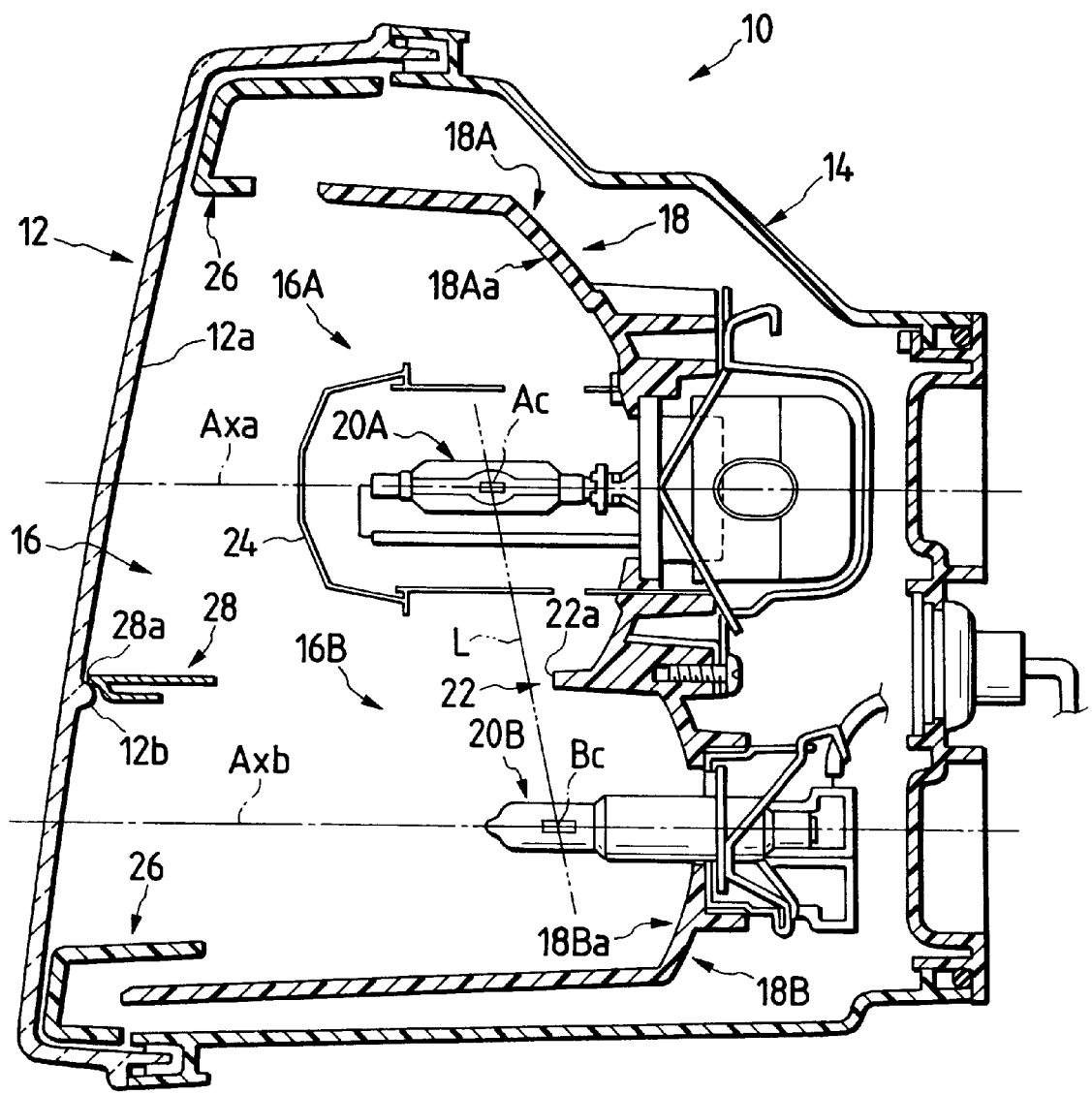
FIG. 2 is a cross-sectional view taken on line II—II in FIG. 1.

As shown in FIGS. 1 and 2, the headlight 10 of this embodiment is a four-light type headlight. In a space formed between the lens 12 and the lamp body 14, there is provided a compound reflector unit 16 comprising an upper reflector unit 16A and a lower reflector unit 16B, which are respectively arranged in an upper row and a lower row. These two reflector units, 16A and 16B, can be tilted in the vertical and the transverse direction.

The lens 12 is a plain-glass lens. The reflector units, 16A and 16B, provide a light distributing function. The upper reflector unit 16A is a low beam reflector unit, and the lower reflector unit 16B is a main beam reflector unit. In this headlight 10, when the upper reflector unit 16A is turned on, a light distribution pattern of a low beam can be formed, and when both reflector units, 16A and 16B, are simultaneously turned on, a light distribution pattern of a main beam can be formed.

The upper reflector unit 16A includes: a reflector 18A, the optical axis Axa of which extends in the longitudinal direction of a vehicle body; and a light source bulb 20A attached to the reflector 18A. The lower reflector unit 16B includes: a reflector 18B, the optical axis Axb of which extends in the longitudinal direction of the vehicle body; and a light source bulb 20B is attached to the reflector 18B.

The light source bulb 20A is an electric discharge bulb (metal halide bulb), and the light source bulb 20B is a halogen bulb (H1 bulb).

The above reflectors 18A, 18B are integrally formed into a compound reflector 18 by means of injection molding. A boundary section 22 between the reflectors 18A, 18B is formed into a partition wall, the front edge 22a of which extends in the substantially horizontal direction in the front view of the headlight. The reflectors 18A and 18B respectively have a reflecting surface 18Aa and a reflecting surface 18Ba, both of which are elongated in width. The reflecting surfaces 18Aa, 18Ba are respectively provided with a plurality of reflecting surface elements 18As, 18Bs which are used for controlling the distribution of light.

The reflector 18A of the upper reflector unit 16A is provided with a shade 24 which surrounds the light source bulb 20A. Direct light emitted from the light source bulb 20A is incident only on the reflecting surface 18Aa of the reflector 18A because of the shade 24.

As shown in FIG. 2, the boundary 22 is located in such a manner that a front edge 22a of the boundary 22 is positioned behind a straight line L connecting a light emitting center Ac of the light source bulb 20A of the upper reflector unit 16A with a light emitting center Bc of the light source bulb 20B of the lower reflector unit 16B.

Figure 3:
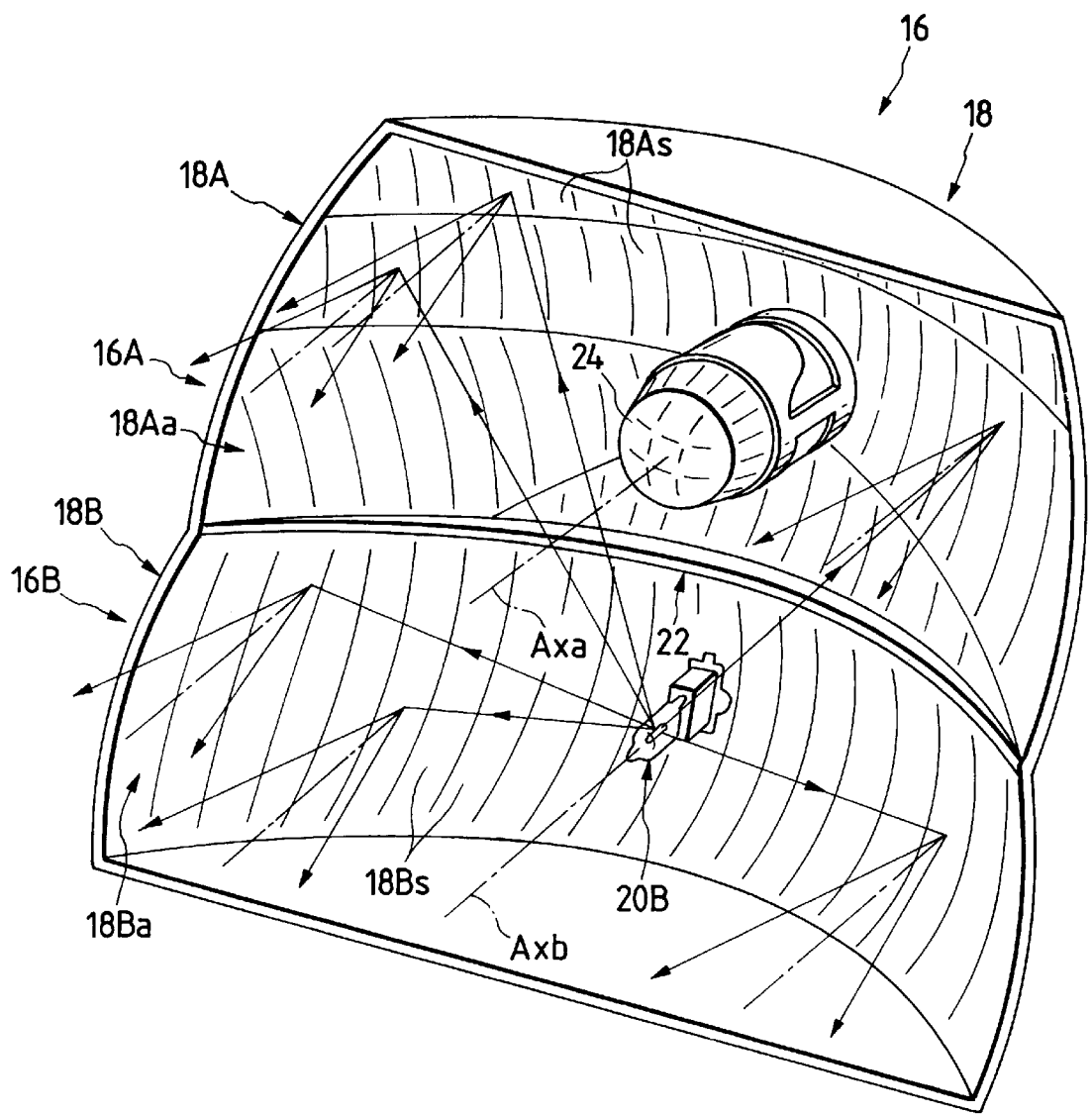
FIG. 3 is a perspective view of the compound reflector unit of the headlight of the first embodiment, wherein the compound reflector unit is shown as a single body.

As shown in FIG. 3, the partition wall comprising the boundary 22 is formed into an arc. Direct light emitted from the light source bulb 20B of the lower reflector unit 16B is incident on the reflecting surface 18Ba of the reflector 18B of the lower reflector unit 16B and at the same time passes through a space formed in the front of the boundary section 22 and is incident on the reflecting surface 18Aa of the reflector 18A of the upper reflector unit 16A.

As shown in FIGS. 1 and 2, in the periphery of the inner surface 12a of the lens 12, there is provided an extension 26 aligned with the peripheral edge of the compound reflector unit 16. Approximately aligned with and in front of the boundary section 22, within the periphery of the inner surface 12a of the lens 12, there is provided a belt-shaped partition plate 28 which extends substantially in the horizontal direction along the lens 12. This partition plate 28 is composed of a metallic plate (iron plate), formed substantially into a U-shape in cross section. A protrusion 28a is provided at the front edge upper portion of partition plate 28.

Both ends of partition plate 28 are engaged with and supported by the extension 26.

Figure 4:
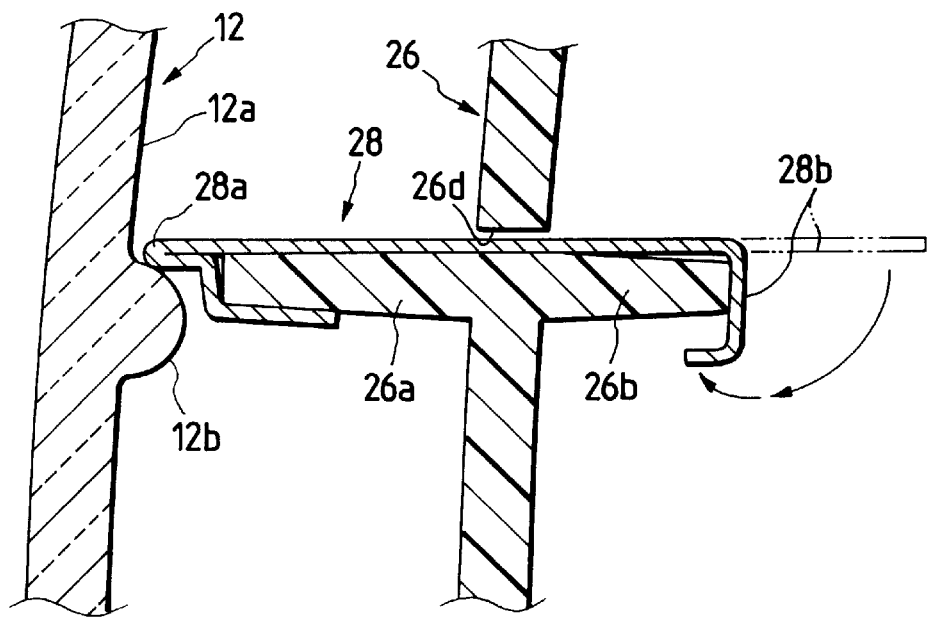
FIG. 4 is a detailed cross-sectional view taken on line IV—IV in FIG. 1.
Figure 5:
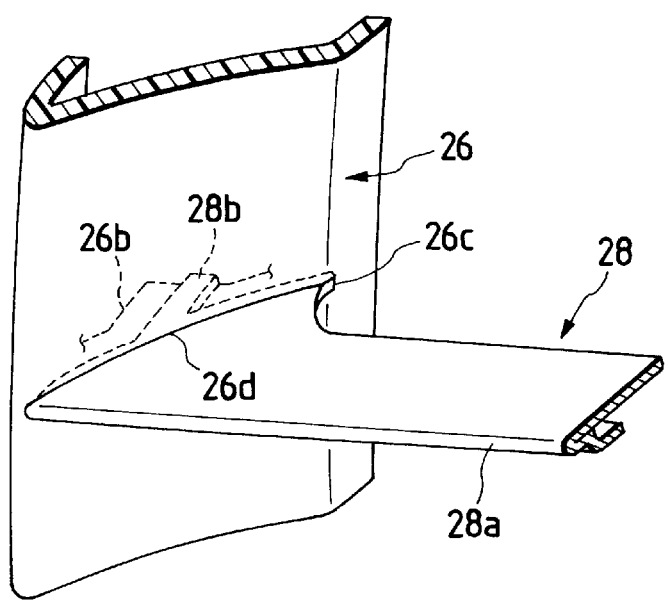
FIG. 5 is a perspective view taken in the direction of V in FIG. 1.

As shown FIG. 4, the extension 26 includes a shelf portion 26a protruding forward and a shelf portion 26b protruding backward, integrally formed with each other. As shown in FIG. 5, on the front surface of the extension 26, there is provided an engaging groove 26c which is formed on the upper surface of shelf portion 26a. Further, a portion of this engaging groove 26c is formed as a notch 26d penetrating to a back surface (rear surface) of the extension 26. On the other hand, at both end portions of the partition plate 28, there are respectively provided long and slender engaging pieces 28b which extend backward so as to be engagable with notch 26d.

After the engaging piece 28b of the partition plate 28 has been inserted into the slit 26d of the extension 26 from the front side and a rear edge of the partition plate 28 has been engaged with the engaging groove 26c of the extension 26, a rear end portion of the engaging groove 28b is bent downward so as to be formed into a hook-shape, and engaged with a rear end portion of the shelf portion 26b of the extension 26. Therefore, the partition plate 28 can be engaged with and supported by the extension 26.

The width of the partition plate 28 is determined to be about 20 mm so that direct light emitted from the light source bulb 20B of the lower reflector unit 16B can pass through a space in the front of the boundary portion 22 and so that it can be incident on the reflecting surface 18Aa of the reflector 18A of the upper reflector unit 16A.

Further, on the inner surface 12a of the lens 12, there can be provided a thick portion 12b which extends along the partition plate 28 so that the thick portion 12b can be engaged with a lower side of the protruding portion 28a of the partition plate 28. A cross-section of the thick portion 12b can be formed into a substantial semicircle.

In operation, direct light emitted from the light source bulb 20B of the lower reflector unit 16B passes through a space in the front of the boundary section 22 between both reflectors 18A, 18B and is incident on the reflector surface 18Aa of the reflector 18A of the upper reflector unit 16A. Therefore, when the main beam of light is turned on, direct light emitted from the light source bulb 20B of the lower reflector unit 16B is reflected on the reflecting surface 18Ba of the reflector 18B of the lower reflector unit 16B and irradiated to the front. At the same time, direct light emitted from the light source bulb 20B of the lower reflector unit 16B is also reflected on the reflecting surface 18Aa of the reflector 18A of the upper reflector unit 16A and irradiated to the front. Due to the foregoing, it is possible to increase a quantity of light of the main beam.

Consequently, according to the first embodiment, it is possible to ensure a sufficiently large quantity of light of the main beam in the headlight for vehicle use in which an upper reflector unit and a lower reflector unit are arranged. Due to the foregoing, it is possible to enhance the visibility in the case of driving at night.

In the first embodiment, the light source bulb 20A of the upper reflector unit 16A is composed of an electric discharge bulb, and the light source bulb 20B of the lower reflector unit 16B is composed of a halogen bulb. In this case, a sufficiently large quantity of light of the low beam can be ensured. However, in a conventional headlight using an low beam electric discharge bulb and a main beam halogen bulb, it may be difficult for a driver to realize that the brightness has been increased when the low beam has been changed over to the main beam because the change to the main beam only results in a comparatively small additional quantity of light emitted from the halogen bulb. However, in the invention, the number of reflecting surfaces is increased on which direct light of halogen bulb 20B is incident, so that a sufficiently large quantity of light of the main beam can be ensured. In the first embodiment of the invention, it is therefore possible for a driver to realize that the brightness has been increased when the low beam has been changed over to the main beam.

The front edge 22a of the boundary section 22 extends in the substantially horizontal direction in the front view of the lighting device. Further, at a position in the front of the boundary section 22 close to the inner surface 12a of the lens 12, there is provided a belt-shaped partition plate 28 which extends along the lens 12 in the substantially horizontal direction. Therefore, when the lighting device is observed from the outside, it looks that the lighting chamber of a low beam and the lighting chamber of a main beam are partitioned from each other. Therefore, although direct light emitted from the light source bulb 20B of the lower reflector unit 16B is incident on the reflecting surface 18Aa of the reflector 18A of the upper reflector unit 16A, a person observing the lighting device can have a good impression in the design of the lighting device.

On the inner surface 12a of the lens 12, there is provided a thick portion 12b which extends along the partition plate 28 so that the thick portion 12b can be engaged with a protruding portion 28a of the partition plate 28 from the lower side. Therefore, it is possible to prevent the deflection of the partition plate 28. Further, by the convex lens effect of the thick portion 12b, it is possible to improve a circumstance in which a front end portion of the partition plate 28 looks dark in the front view of the lighting device.

Figure 6:
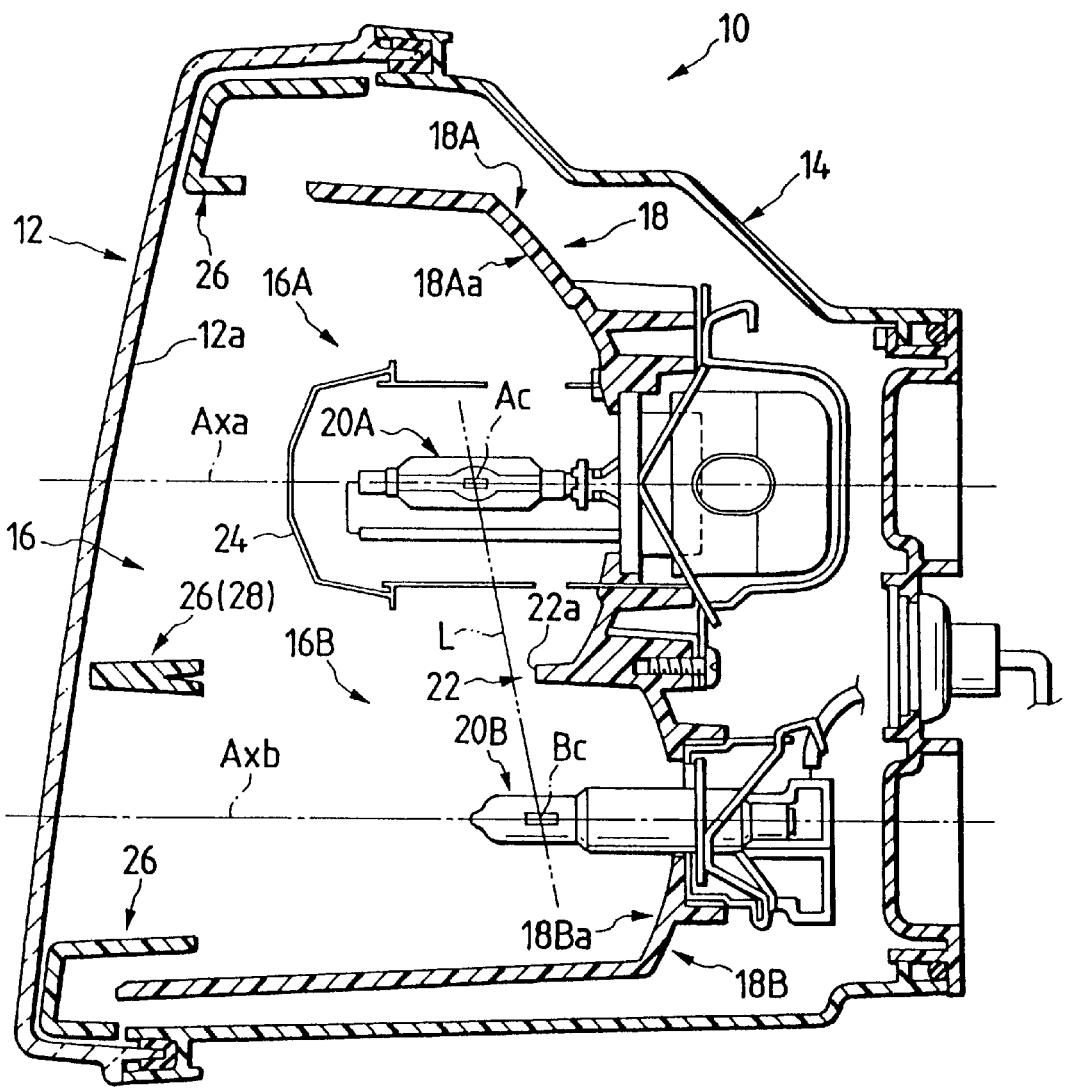
Figure 7:
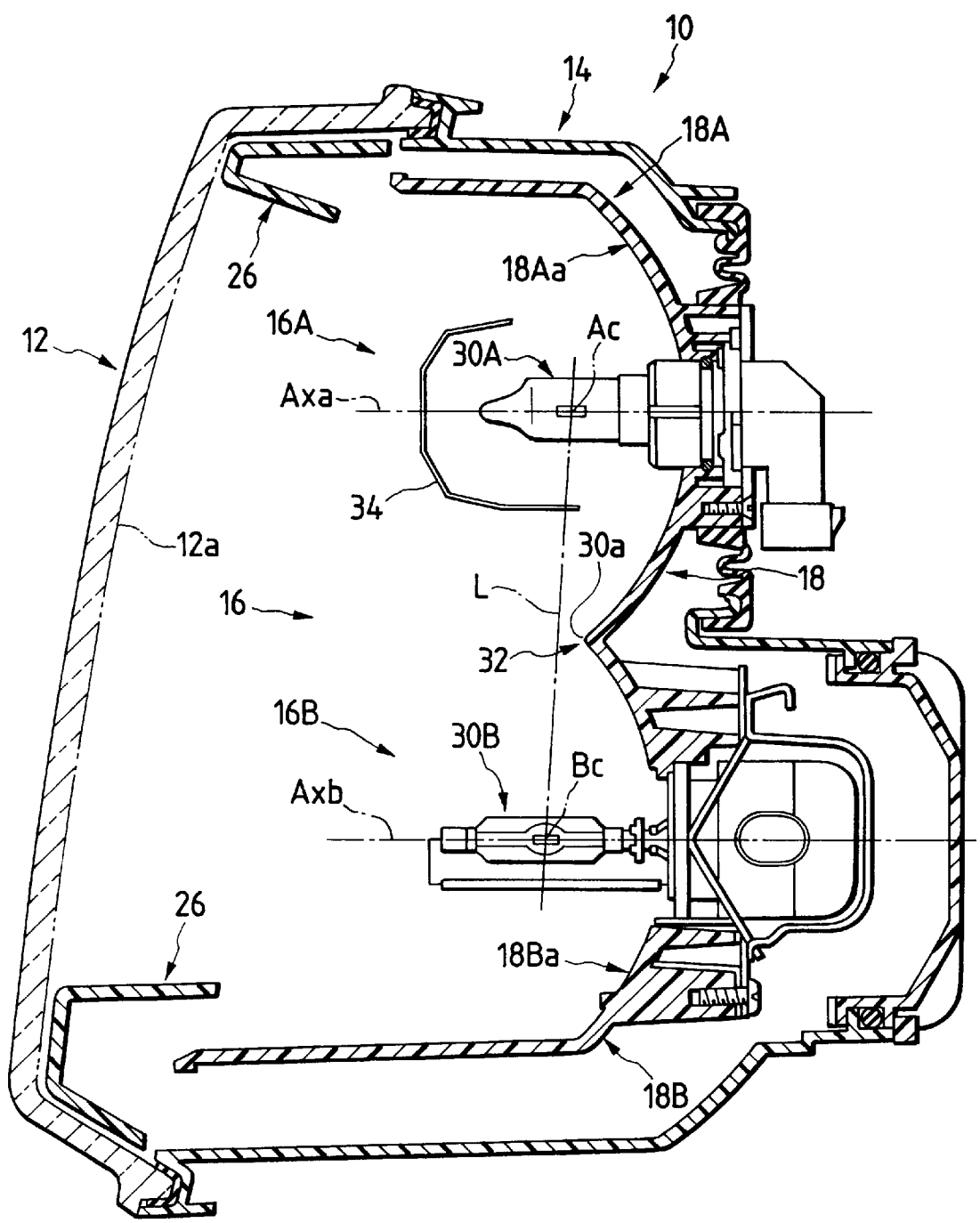

In an alternative embodiment, as shown in FIG. 6, the partition plate 28 is integrally formed as a portion of the extension 26. Due to the above construction, it is possible to arrange the partition plate without increasing the number of parts, and further it is possible to eliminate the labor required when the partition plate 28 is attached to the extension 26. When integrated with the extension 26, the partition plate 28 is seldom deformed by deflection. Accordingly, a front end portion of the partition plate 28 can be formed into a simple shape. Therefore, the front end portion of the partition plate 28 seldom becomes a dark portion. For the above reasons, it becomes unnecessary for the thick portion 12b to be formed on the inner surface 12a of the lens 12.

A second embodiment of the present invention, having characteristics and features similar to those above, except as provided below, will now be explained. The second light source bulb 30A of the reflector unit 16A is composed of a halogen bulb, for example a bulb of HB3 or a bulb of 9005. The light source bulb 30B of the reflector unit 16B is composed of an electric discharge bulb 30B (metal halide bulb).

The shade 34 surrounding the light source bulb 30A is attached to the reflector 18A of the upper reflector unit 16A. Power of the light source bulb 30A is not as high as that of the electric discharge bulb 20A of the first embodiment. Accordingly, the shade 34 is made smaller than that of the shade 24 of the first embodiment, providing less shading. However, direct light emitted from the light source bulb 30A is positively prevented from being incident on the reflector 18B of the lower reflector unit 16B.

The cross-section of the boundary section 32 between both reflectors 18A and 18B is different from that of the boundary section 22 of the first embodiment. The front edge 32a of the boundary section 32 extends in the substantially horizontal direction in the front view of the lighting device. Also, the front edge 32a of the boundary section 32 is positioned behind a straight line L connecting the light emitting center Ac of the light source bulb 30B of the upper reflector unit 16A with the light emitting center Bc of the light source bulb 30B of the lower reflector unit 16B.

Similar to the first embodiment, direct light emitted from the light source bulb 30B of the lower reflector unit 16B passes through a space in the front of the boundary section 32 between both reflectors 18A, 18B and is incident on the reflector surface 18Aa of the reflector 18A of the upper reflector unit.

The light source bulb 30B of the lower reflector unit 16B is an electric discharge bulb. Therefore, the quantity of light of the main beam can be greatly increased and the color rendering can be enhanced by the effect of high power and high luminance of the electric discharge bulb. For the above reasons, it is possible to further enhance the visibility in the case of driving at night.

What is claimed is:

1. A headlight comprising:

an upper reflector unit adapted for forming a low beam;

a lower reflector unit adapted for forming a main beam;

a light source bulb attached to at each of the upper reflector unit and lower reflector unit;

a boundary section between the upper reflector unit and the lower reflector unit;

wherein the upper reflector unit and the lower reflector unit are integrated with each other; and wherein direct light emitted from the light source bulb of the lower reflector unit passes through a space in the front of the boundary section and is incident on the upper reflector unit.

2. A headlight for vehicle use according to claim 1, wherein a front edge of the boundary section is located at a rear of a straight line connecting a light emitting center of the light source bulb of the upper reflector unit with a light emitting center of the light source bulb of the lower reflector unit.

3. A headlight for vehicle use according to claim 1 or 2, wherein the front edge of the boundary section extends substantially in the horizontal direction in a front view of the lighting device.

4. A headlight for vehicle use according to claim 3 further comprising:

a single lens arranged in front of the upper reflector unit and the lower reflector;

a partition plate arranged in front of the boundary section;

wherein the partition plate is close to an inner surface of the lens so that the partition plate extends substantially in a horizontal direction along the lens.

5. A headlight for vehicle use according to claim 4 further comprising:

a thick section arranged on an inner surface of the lens;

wherein the thick section extends along and contacts a lower surface of the partition plate.

6. A headlight for vehicle use according to claim 1, wherein the light source bulb attached to the lower reflector unit is an electric discharge bulb.

7. A headlight for vehicle use according to claim 4, wherein the light source bulb attached to the upper reflector unit is an electric discharge bulb.

* * * * *